No. 712,263. Patented Oct. 28, 1902.
W. O. COLEMAN.
COTTON SEED SEPARATOR AND CLEANER.
(Application filed Feb. 15, 1902.)

(No Model.)

Witnesses
Inventor,
William O. Coleman.
By James L. Norris
Atty.

THE NORRIS PETERS CO., PHOTO-LITHO., WASHINGTON, D. C.

UNITED STATES PATENT OFFICE.

WILLIAM O. COLEMAN, OF CENTERVILLE, MISSISSIPPI, ASSIGNOR TO JULIA C. COLEMAN, OF CENTERVILLE, MISSISSIPPI.

COTTON-SEED SEPARATOR AND CLEANER.

SPECIFICATION forming part of Letters Patent No. 712,263, dated October 28, 1902.

Application filed February 15, 1902. Serial No. 94,261. (No model.)

*To all whom it may concern:*

Be it known that I, WILLIAM O. COLEMAN, a citizen of the United States, residing at Centerville, in the county of Wilkinson and State of Mississippi, have invented new and useful Improvements in Cotton-Seed Separators and Cleaners, of which the following is a specification.

My invention relates to cotton-seed separators and cleaners, the object of the same being to provide a novel construction and arrangement of parts whereby cotton-seed or other like granular material may be drawn by suction from one or more points and delivered in a downwardly-directed stream into the separating-chamber upon a seed-valve located at the lower end of said chamber, whereby the seed is cut off from the current and discharged onto a conveyer and the lint or other like foreign matter in the seed is separated therefrom and carried off with the current to the fan.

The details of the invention will hereinafter appear, and that which I regard as new will be set forth in the claims.

Figure 1:
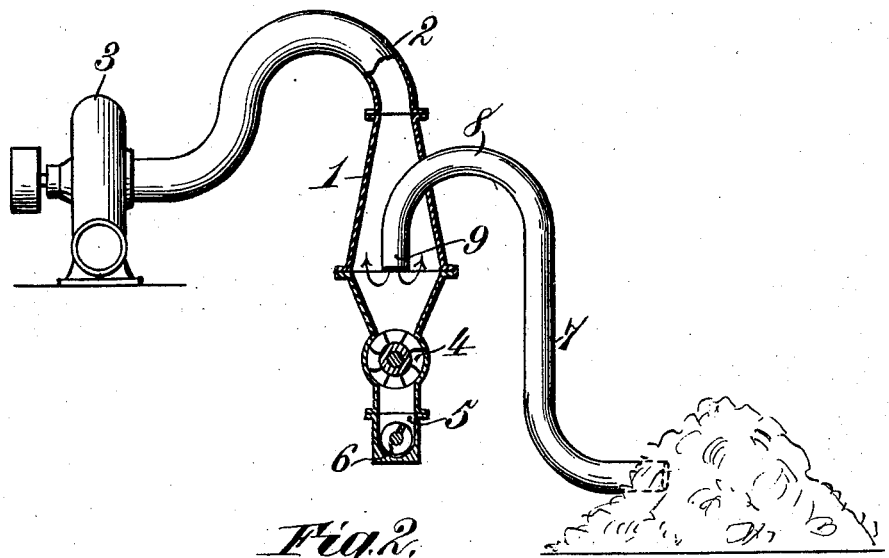
Figure 2:
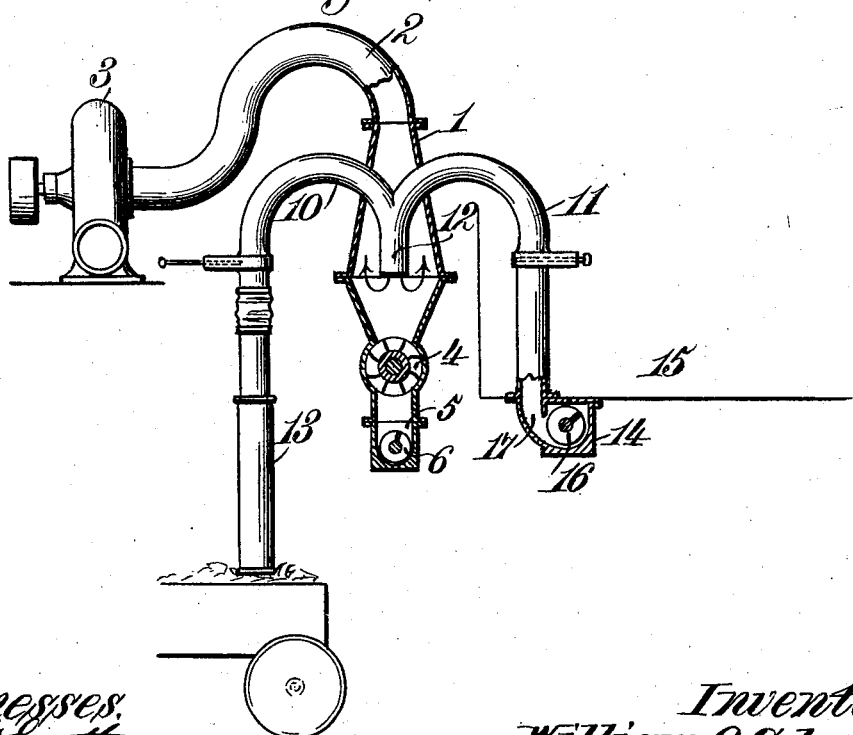

In the drawings forming part of this specification, Figure 1 is a sectional elevation illustrative of my invention, and Fig. 2 is a similar view showing an alternative construction. Like reference-numerals indicate like parts in the different views.

My improved separator and cleaner is made up of a separating-chamber 1, having a main suction-pipe 2 connected with the upper end thereof and communicating with a fan 3 and other suitable exhausting apparatus. At the lower end of the separating-chamber 1 is a rotary seed-valve 4, which may be of any suitable form and construction, the same being designed to receive and deliver the seed from the separating-chamber 1, while at the same time sealing the lower end of said chamber, so as to prevent the entrance of air thereto. The seed-valve 4 discharges into a trough or receptacle 5, in which is located a conveyer 6 of the screw or other suitable type. Coöperating with these parts is a seed-pipe 7, which communicates with a wagon, car, or other source of supply for cotton-seed and has formed upon its upper end a crook or bend 8, the same extending into the separating-chamber 1 and discharging downwardly. The discharge end 9 of the seed-pipe 7 is of smaller diameter than the separating-chamber 1 in which it is located, and the same terminates at a point above the seed-valve 4 and at a point opposite the widest diameter of the separating-chamber 1.

When the device is in operation, the fan 3 exhausts the air from the main suction-pipe 2, the separating-chamber 1, and the seed-pipe 7, the same acting by suction to draw the cotton-seed or other granular material operated upon from the wagon, car, or other source of supply up through the pipe 7 and down and around the crook or bend 8 therein, the said seed being discharged from the pipe 7 downwardly toward the seed-valve 4. As the separating-chamber 1 is of larger diameter than the seed-pipe 7, it will be obvious that the force of the suction in said separating-chamber will be less than it is in said seed-pipe 7. The result is that as the cotton-seed is discharged from the end 9 of the seed-pipe it will be projected upon the seed-valve 4, whereas the lint and other light particles of foreign matter contained in said seed will be taken up by the current through the suction-pipe 2 to the fan 3. The seed will thereby be effectually cleaned and after delivery through the valve 4 to the trough 5 may be carried off to any suitable point by means of the conveyer 6. Instead of a single suction seed-pipe 7, which discharges into the separating-chamber 1, I may employ a plurality or series of said seed-pipes, as shown in Fig. 2 of the drawings. The seed-pipe 10 and the seed-pipe 11 lead into the separating-chamber 1 at their upper ends and merge into a common discharge-pipe 12, which extends downwardly toward the seed-valve 4 and terminates at a point opposite the widest point of the separating-chamber 1. The seed-pipe 10 is provided with a telescopic end piece 13, by means of which it may be used upon a seed-containing wagon, whereas the seed-pipe 11 communicates at its lower end with a trough 14, located beneath the seed-house 15, as clearly shown. In the trough 14 is located an ordinary screw conveyer 16, communication between which and the said pipe 11 being established by the shoe 17. The conveyer 16 serves to feed the cotton-seed or other granular material under treatment from the end of the trough 14 which is supplied directly from the seed-house 15 to that portion of said trough to which the seed-pipe 11 is connected. The operation in this form of my invention is similar to that first above described, the difference being that a plurality of seed-pipes instead of one is employed. By this construction seed or granular material may be drawn from different separated points, discharged into the separating-chamber, and cleaned, the foreign matter being carried off through the suction-pipe 2 to the fan 3, while the seed itself is delivered from the valve 4 onto the conveyer 5 and by the latter is conveyed to any point.

Having now described my invention, what I claim as new, and desire to secure by Letters Patent, is—

1. In a cotton-seed separator and cleaner, a vertically-disposed separating-chamber, an exhausting apparatus, a main suction-pipe leading from the upper end of said separating-chamber to said exhausting apparatus, a seed-valve at the lower end of said separating-chamber adapted to discharge seed therefrom and prevent the admission of air thereto, and a seed-pipe having a crooked or bent upper end extending through the side of said separating-chamber to the interior thereof, and having its discharge end located directly below said suction-pipe, and completely surrounded by said separating-chamber, the said seed-pipe discharging downwardly toward said seed-valve and located a short distance above the same.

2. In a cotton-seed separator and cleaner, a vertically-disposed separating-chamber, an exhausting apparatus, a main suction-pipe leading from the upper end of said separating-chamber to said exhausting apparatus, a seed-valve at the lower end of said separating-chamber adapted to discharge seed therefrom and prevent the admission of air thereto, and a plurality of seed-pipes whose upper ends are bent or crooked, extend into said separating-chamber, and merge into a common downwardly-directed discharge-pipe located a short distance above said seed-valve, and of smaller diameter than said chamber.

In testimony whereof I have hereunto set my hand in presence of two subscribing witnesses.

WILLIAM O. COLEMAN.

Witnesses:
  J. A. SMYLIE,
  H. S. ARCHER, Jr.